(12) United States Patent
Interlandi et al.

(10) Patent No.: US 12,468,701 B2
(45) Date of Patent: Nov. 11, 2025

(54) METHOD AND SYSTEM FOR QUERY PROCESSING OVER TENSOR RUNTIMES

(71) Applicant: Microsoft Technology Licensing, LLC, Redmond, WA (US)

(72) Inventors: Matteo Interlandi, Torrance, CA (US); Konstantinos Karanasos, San Francisco, CA (US); Dong He, Seattle, WA (US); Dalitso Hansini Banda, Mountain View, CA (US); Jesus Camacho Rodriguez, Sunnyvale, CA (US); Rathijit Sen, Madison, WI (US); Supun Chathurang Nakandala, San Diego, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 226 days.

(21) Appl. No.: 17/587,952

(22) Filed: Jan. 28, 2022

(65) Prior Publication Data
US 2023/0244662 A1 Aug. 3, 2023

(51) Int. Cl.
*G06F 16/2453* (2019.01)
*G06F 16/2458* (2019.01)
*G06N 3/04* (2023.01)

(52) U.S. Cl.
CPC .... *G06F 16/24542* (2019.01); *G06F 16/2458* (2019.01); *G06N 3/04* (2013.01)

(58) Field of Classification Search
CPC .. G06F 16/24542; G06F 16/2458; G06N 3/04
See application file for complete search history.

(56) References Cited

U.S. PATENT DOCUMENTS

| | | | | |
|---|---|---|---|---|
| 2017/0323200 | A1* | 11/2017 | Corvinelli | G06N 3/048 |
| 2019/0384766 | A1* | 12/2019 | Sirin | G06F 16/24542 |
| 2021/0365817 | A1* | 11/2021 | Riegel | G06N 5/046 |
| 2022/0179703 | A1* | 6/2022 | Vincent | G06F 9/547 |

OTHER PUBLICATIONS http://info.phys.unm.edu/~ideutsch/Classes/Phys531F11/SphericalTensors.pdf Tensor Operator (Year: 2011).*
"International Search Report and Written Opinion Issued in PCT Application No. PCT/US22/050997", Mailed Date: Apr. 4, 2023, 10 Pages.

(Continued)

*Primary Examiner* — Ajay M Bhatia
*Assistant Examiner* — Chongsuh Park
(74) *Attorney, Agent, or Firm* — ArentFox Schiff LLP

(57) ABSTRACT

Example aspects include techniques for query processing over deep neural network runtimes. These techniques may include receiving a query including one or more query operators and determining a query representation based on the one or more query operators. In addition, the techniques may include determining a neural network program based on the query representation, the neural network program including one or more neural network operators for performing the query in a neural network runtime, generating a neural network data structure based on a dataset associated with the query, and executing the neural network program in the neural network runtime over the neural network data structure to generate a query result.

20 Claims, 4 Drawing Sheets

(56) References Cited

OTHER PUBLICATIONS

"BLAS (Basic Linear Algebra Subprograms)", Retrieved from: https://web.archive.org/web/20220111135702/http://www.netlib.org/blas/, Jan. 11, 2022, 7 Pages.

"BlazingSQL", Retrieved from: https://web.archive.org/web/20220111192904/https://blazingsql.com/, Jan. 11, 2022, 11 Pages.

"Cerebras", Retrieved from: https://web.archive.org/web/20211225120804/https://cerebras.net/, Dec. 25, 2021, 11 Pages.

"CS-2: A Revolution in AI Infrastructure", Retrieved from: https://web.archive.org/web/20211125141946/https://cerebras.net/system/, Nov. 25, 2021, 13 Pages.

"GraphBLAS", https://web.archive.org/web/20211115085718/https://people.engr.tamu.edu/davis/GraphBLAS.html, Nov. 15, 2021, 4 Pages.

"GraphCore", Retrieved from: https://web.archive.org/web/20220115073558/https://www.graphcore.ai/, Jan. 15, 2022, 11 Pages.

"H2O : Algorithms Roadmap", Retrieved from: https://github.com/h2oai/h2o-3/blob/master/h2o-docs/src/product/flow/mages/H2O-Algorithms-Road-Map.pdf, Feb. 1, 2015, 5 Pages.

"Massively Accelerated Analytics", Retrieved from: https://web.archive.org/web/20220113231707/https://www.omnisci.com/, Jan. 13, 2022, 7 Pages.

"MXNet: A Flexible and Efficient Library for Deep Learning", Retrieved from: https://web.archive.org/web/20211223080500/https://mxnet.apache.org/versions/1.9.0/, Dec. 23, 2021, 7 Pages.

"Numba documentation", Retrieved from: https://web.archive.org/web/20211007203332/https://numba.pydata.org/numba-doc/latest/index.html, Oct. 7, 2021, 5 Pages.

"OpenCL", Retrieved from: https://web.archive.org/web/20220105010956/https://www.khronos.org/opencl/, Jan. 5, 2022, 10 Pages.

"Resource & Documentation Center", Retrieved from: https://web.archive.org/web/20220116214235/https://www.intel.com/content/www/us/en/documentation-resources/developer.html, Jan. 16, 2022, 4 Pages.

"Sambanova", Retrieved from: https://web.archive.org/web/20211221225314/https://sambanova.ai/, Dec. 21, 2021, 6 Pages.

"Spark-RAPIDS", Retrieved from: https://web.archive.org/web/20211128173918/https://nvidia.github.io/spark-rapids/, Nov. 28, 2021, 4 Pages.

"Statistics", Retrieved from: https://docs.microsoft.com/en-us/sql/relational-databases/statistics/statistics?view=sql-server-ver15, Dec. 1, 2021, 26 Pages.

"Tensorflow", Retrieved from: https://web.archive.org/web/20220117173321/https://www.tensorflow.org/, Jan. 17, 2022, 10 Pages.

"The Fastest Path to Graph", Retrieved from: https://web.archive.org/web/20220116231228/https://neo4j.com/, Jan. 16, 2022, 15 Pages.

"Ailinx", Retrieved from: https://www.xilinx.com/products/design-tools/vitis/vitis-platform.html, Retrieved Date: Nov. 24, 2021, 24 Pages.

"XLA: Optimizing Compiler for Machine Learning", Retrieved from: https://web.archive.org/web/20220115213821/https://www.tensorflow.org/xla, Jan. 15, 2022, 10 Pages.

Ahmed, et al., "Machine Learning at Microsoft with ml.net", In Proceedings of the 25th ACM SIGKDD International Conference on Knowledge Discovery & Data Mining, Aug. 4, 2019, pp. 2448-2458.

Amodei, et al., "AI and Compute", Retrieved from: https://openai.com/blog/ai-and-compute/, May 16, 2018, 07 Pages.

Armbrust, et al., "Spark SQL: Relational Data Processing in Spark", In Proceedings of the ACM SIGMOD International Conference on Management of Data, May 31, 2015, pp. 1383-1394.

Assaf, et al., "Cardinality Estimation (SQL Server)", Retrieved from: https://docs.microsoft.com/en-us/sql/relational-databases/performance/cardinality-estimation-sql-server?view=sql-server-ver15, Dec. 8, 2021, 16 Pages.

Balkesen, et al., "Multicore, main-memory joins: Sort vs. hash revisited", In Proceedings of the VLDB Endowment, vol. 7, Issue 1, Sep. 1, 2013, pp. 85-96.

Barthels, et al., "Distributed join algorithms on thousands of cores", In Proceedings of the VLDB Endowment, vol. 10, Issue 5, Jan. 2017, pp. 517-528.

Basoglu, et al., "The Microsoft Cognitive Toolkit", Retrieved From: https://docs.microsoft.com/en-us/cognitive-toolkit/, Jul. 28, 2021, 2 Pages.

Boncz, et al., "MonetDB/X100: Hyper-Pipelining Query Execution", In Proceedings of Second Biennial Conference on Innovative Data Systems Research, Jan. 4-7, 2005, 13 Pages.

Chen, et al., "Learning to Optimize Tensor Programs", In Proceedings of the 32nd International Conference on Neural Information Processing Systems, Dec. 3, 2018, 16 Pages.

Chen, et al., "TVM: An Automated End-to-End Optimizing Compiler for Deep Learning", In Proceedings of the 13th USENIX Symposium on Operating Systems Design and Implementation, Oct. 8, 2018, pp. 579-594.

Chen, et al., "XGBoost: A Scalable Tree Boosting System", In Proceedings of the 22nd ACM SIGKDD International Conference on Knowledge Discovery and Data Mining, Aug. 13, 2016, pp. 785-794.

Dean, et al., "MapReduce: Simplified Data Processing on Large Clusters", In Magazine Communications of the ACM—50th Anniversary, vol. 51, Issue 1, Jan. 1, 2008, 13 Pages.

Dickson, Ben, "The untold story of how GPT-3 is the transformation of OpenAI", Retrieved from: https://bit.ly/36lo710., Aug. 17, 2020, 13 Pages.

Fang, et al., "In-memory database acceleration on FPGAs: a survey", In The VLDB Journal, Oct. 26, 2019, pp. 33-59.

Fyles, Matt, "Graphcore Announces Production Release of PyTorch for IPU", Retrieved from: https://medium.com/bytorch/graphcore-announces-production-release-of-pytorch-for-ipu-f1a846de1a2f, Dec. 9, 2020, 8 Pages.

Gale, Trevor, "The Future of Sparsity in Deep Neural Networks", Retrieved from: https://www.sigarch.org/the-future-of-sparsity-in-deep-neural-networks/, Dec. 3, 2020, 15 Pages.

Gommers, et al., "SciPy", Retrieved from: https://github.com/scipy/scipy/, Nov. 25, 2021, 10 Pages.

Gonzalez, et al., "GraphX: Graph Processing in a Distributed Dataflow Framework", In Proceedings of the 11th USENIX Conference on Operating Systems Design and Implementation, Oct. 6, 2014, 15 Pages.

Goodfellow, et al., "Deep Learning", In Publication of MIT Press, 2016, 802 Pages.

Heimel, et al., "Hardware-Oblivious Parallelism for in-Memory Column-Stores", In Proceedings of the VLDB Endowment., Aug. 26, 2013, pp. 709-720.

Holanda, et al., "Relational Queries with a Tensor Processing Unit", In Proceedings of the 15th International Workshop on Data Management on New Hardware, Jul. 1, 2019, 3 Pages.

Hutchison, et al., "LaraDB: A Minimalist Kernel forLinear and Relational Algebra Computation", In Proceedings of the 4th ACM Workshop on Algorithms and Systems for MapReduce and Beyond, May 19, 2017, 10 Pages.

Jeong, et al., "JANUS: Fast and Flexible Deep Learning via Symbolic Graph Execution of Imperative Programs", In Proceedings of 16th USENIX Symposium on Networked Systems Design and Implementation, Feb. 26, 2019, pp. 453-467.

Jia, et al., "TASO: Optimizing Deep Learning Computation with Automatic Generation of Graph Substitutions", In Proceedings of the 27th ACM Symposium on Operating Systems Principles, Oct. 27, 2019, pp. 47-62.

Jouppi, et al., "In-Datacenter Performance Analysis of a Tensor Processing Unit", In Repository of arXiv:1704.04760, Apr. 16, 2017, 17 Pages.

Karanasos, et al., "Extending Relational Query Processing with ML Inference", In Proceedings of 10th Annual Conference on Innovative Data Systems Research, Jan. 12, 2020, 8 Pages.

Kersten, et al., "Everything You Always Wanted to Know About Compiled and Vectorized Queries But Were Afraid to Ask", In Proceedings of the VLDB Endowment, vol. 11, No. 13, Sep. 1, 2018, pp. 2209-2222.

Kjolstad, et al., "The tensor algebra compiler", In Proceedings of the ACM on Programming Languages, Oct. 12, 2017, 29 Pages.

(56) References Cited

OTHER PUBLICATIONS

Kohn, et al., "Adaptive Execution of Compiled Queries", In Proceedings of IEEE 34th International Conference on Data Engineering, Apr. 16, 2018, 12 Pages.
Kotlyar, et al., "A Relational Approach to the Compilation of Sparse Matrix Programs.", In Technical Report, Aug. 26, 1997, pp. 318-327.
Lakhotia, et al., "GPOP: A cache and memory-efficient framework for graph processing over partitions", In Proceedings of the 24th Symposium on Principles and Practice of Parallel Programming, Feb. 16, 2019, pp. 393-394.
Zheng, et al., "Ansor: Generating High-Performance Tensor Programs for Deep Learning", In Proceedings of 14th USENIX Symposium on Operating Systems Design and Implementation, Nov. 4, 2020, pp. 863-879.
Lattner, et al., "MLIR: A Compiler Infrastructure for the End of Moore's Law", In Repository of arXiv preprint arXiv:2002.11054, Feb. 25, 2020, 21 Pages.
Lopes, et al., "Hints (Transact-SQL)—Query", Retrieved from: https://docs.microsoft.com/en-us/sql/t-sql/queries/hints-transact-sql-query?view=sql-server-ver15, Sep. 21, 2021, 25 Pages.
McSherry, et al., "Scalability! But at what COST?", In Proceedings of the 15th US EN IX conference on Hot Topics In Operating Systems, May 2015, 6 Pages.
Meng, et al., "MLlib: Machine Learning in Apache Spark", In Journal of Machine Learning Research, vol. 17, Issue 1, Jan. 1, 2016, 7 Pages.
Moreau, et al., "A Hardware-Software Blueprint for Flexible Deep Learning Specialization", In Repository of arXiv:1807.04188v3, Apr. 23, 2019, 7 Pages.
Nakandala, et al., "A Tensor Compiler for Unified Machine Learning Prediction Serving", In Proceedings of 14th USENIX Symposium on Operating Systems Design and Implementation (OSDI 20)., Nov. 4, 2020, pp. 899-917.
Neumann, Thomas, "Efficiently Compiling Efficient Query Plans for Modern Hardware", In Proceedings of the VLDB Endowment, vol. 4, Issue 9, Aug. 29, 2011, pp. 539-550.
Page, et al., "The pagerank citation ranking: Bringing order to the web", In Technical report, Stanford InfoLab, Nov. 11, 1999, pp. 1-17.
Paszke, et al., "Automatic differentiation in PyTorch", In Proceedings of 31st Conference on Neural Information Processing Systems, Dec. 4, 2017, 4 Pages.
Pedregosa, et al., "Scikit-learn: Machine Learning in Python", In Journal of Machine Learning Research, vol. 12, Nov. 1, 2011, pp. 2825-2830.
Pirk, et al., "Voodoo—a Vector Algebra for Portable Database Performance on Modern Hardware", In Proceedings of the VLDB Endowment, vol. 9, No. 14, Oct. 1, 2016, pp. 1707-1708.
Ragan-Kelley, et al., "Halide: A Language and Compiler for Optimizing Parallelism, Locality, and Recomputation in Image Processing Pipelines", In Proceedings of the 34th ACM SIGPLAN Conference on Programming Language Design and Implementation, Jun. 16, 2013, pp. 519-530.
Rees, et al., "cuGraph—GPU Graph Analytics", Retrieved from: https://github.com/rapidsai/cugraph, Dec. 9, 2021, 9 Pages.
Ross, Kennetha. , "Selection Conditions in Main Memory", In Journal of ACM Transactions on Database Systems, vol. 29, Issue 1, Mar. 1, 2004, pp. 132-161.
Rossbach, et al., "Dandelion: a compiler and runtime for heterogeneous systems", In Proceedings of ACM SIGOPS 24th Symposium on Operating Systems Principles,, Nov. 3, 2013, pp. 49-68.
Sergeev, et al., "Horovod: Fast and Easy Distributed Deep Learning in TensorFlow", In Repository of arXiv:1802.05799, Feb. 21, 2018, 10 Pages.
Shanbhag, et al., "A Study of the Fundamental Performance Characteristics of GPUs and CPUs for Database Analytics", In Proceedings of the ACM SIGMOD International Conference on Management of Data, Jun. 14, 2020, pp. 1617-1632.
Shkapsky, et al., "Big Data Analytics with Datalog Queries on Spark", In Proceedings of the International Conference on Management of Data, Jun. 14, 2016, pp. 1135-1149.
Vasilache, et al., "The Next 700 Accelerated Layers: From Mathematical Expressions of Network Computation Graphs to Accelerated GPU Kernels, Automatically", In Journal of ACM Transactions on Architecture and Code Optimization, Oct. 11, 2019, 26 Pages.
Vilim, et al., "Gorgon: accelerating machine learning from relational data.", In Proceedings of ACM/IEEE 47th Annual International Symposium on Computer Architecture, May 30, 2020, pp. 309-321.
Wang, et al., "SPORES: Sum-Product Optimization via Relational Equality Saturation for Large Scale Linear Algebra", In Proceedings of the VLDB Endowment, vol. 13, No. 11, Jul. 2020, pp. 1919-1932.
Yang, et al., "GraphBLAST: A High-Performance Linear Algebra-based Graph Framework on the GPU.", In Repository of arXiv: 1908.01407v5, Jun. 15, 2021, 50 Pages.
Yang, et al., "pytorch", Retrieved from: https://github.com/pytorch/pytorch/issues/22378, Jun. 30, 2019, 13 Pages.
Yuan, et al., "Offload Annotations: Bringing Heterogeneous Computing to Existing Libraries and Workloads", In Proceedings of USENIX Annual Technical Conference, Jul. 15, 2020, pp. 293-306.
Zaharia, et al., "Resilient Distributed Datasets: A Fault-Tolerant Abstraction for In-Memory Cluster Computing", In Proceedings of the 9th USENIX conference on Networked Systems Design and Implementation, Apr. 25, 2012, 14 Pages.
Zedlewski, John, "RAPIDS Forest Inference Library: Prediction at 100 million rows per second", Retrieved From: https://medium.com/rapids-ai/rapids-forest-inference-library-prediction-at-100-million-rows-per-second-19558890bc35, Aug. 30, 2019, 13 Pages.
Zhang, et al., "onnx", Retrieved from: https://github.com/onnx/onnx/blob/main/docs/Operators.md, Nov. 20, 2021, 308 Pages.
Koutsoukos, et al., Tensors: An abstraction for general data processing, In Proceedings of the VLDB Endowment, vol. 14, No. 10, Oct. 26, 2021, pp. 1797-1804.
Leskovec, Jure., "LiveJournal social network", Retrieved from: https://web.archive.org/web/20211019231302/https://snap.stanford.edu/data/soc-LiveJournal1.html, Oct. 19, 2021, 1 Page.
"PyTorch", Retrieved from: https://web.archive.org/web/20211221041840/https://pytorch.org/ecosystem/, Jan. 23, 2022, 3 Pages.
Interlandi., "Hummingbird", Retrieved from: https://github.com/microsoft/hummingbird, Dec. 15, 2021, 7 Pages.

\* cited by examiner

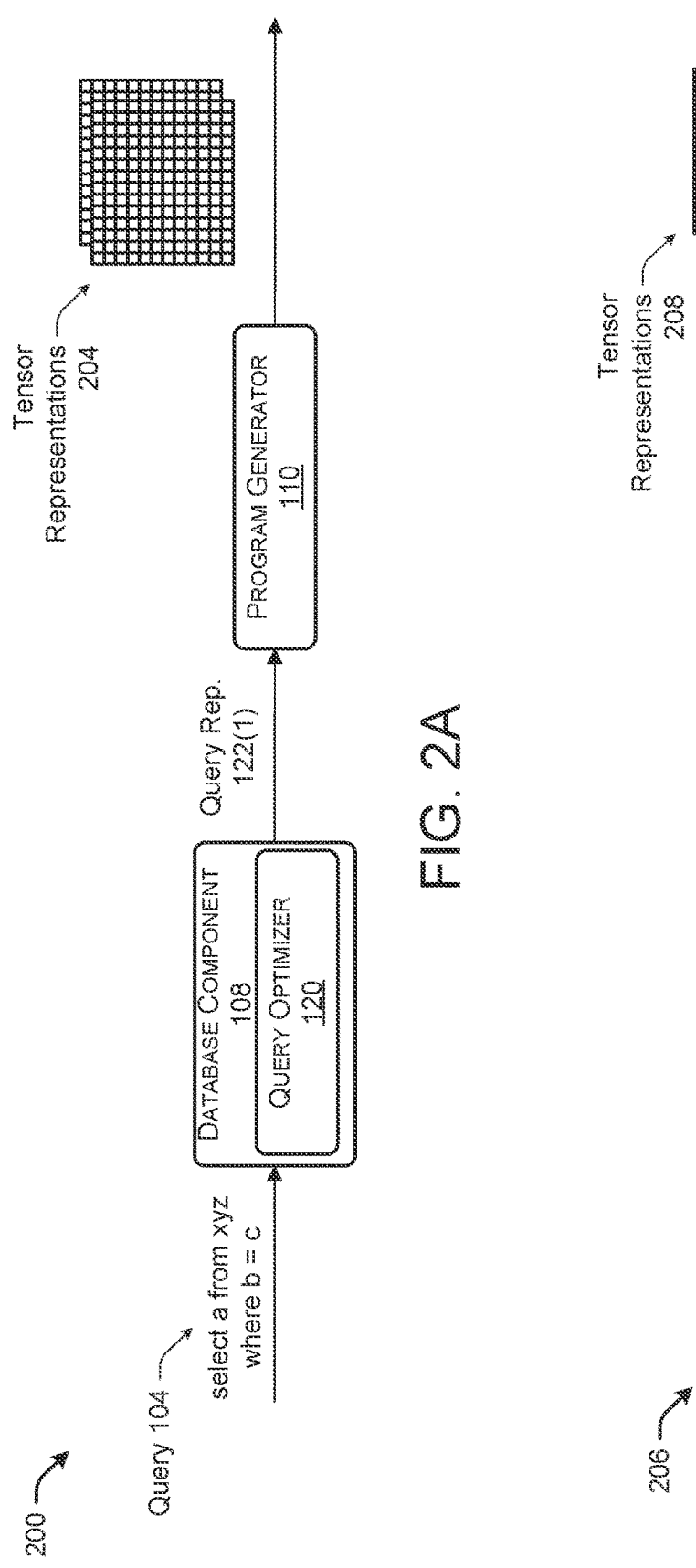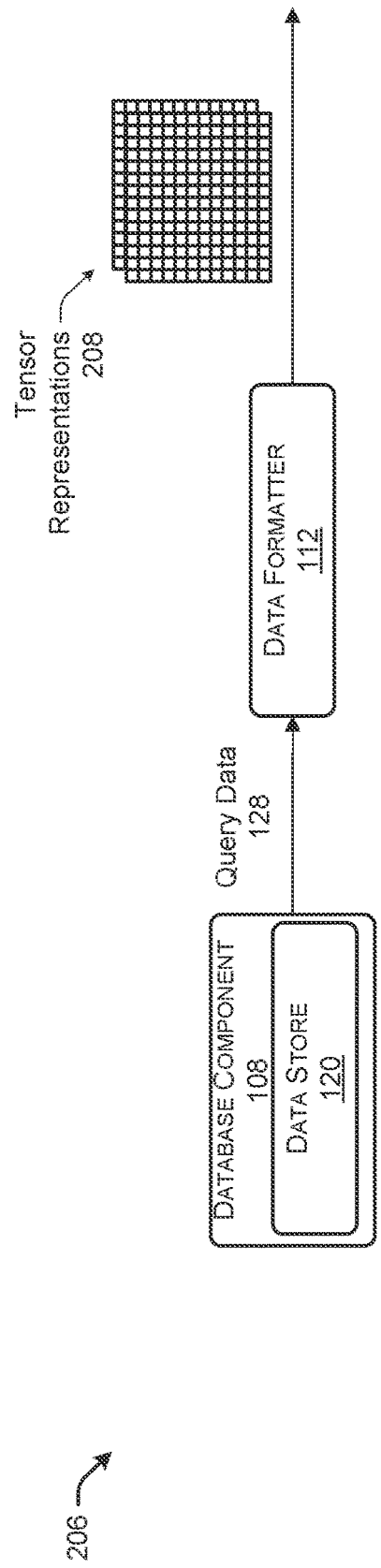

METHOD AND SYSTEM FOR QUERY PROCESSING OVER TENSOR RUNTIMES

BACKGROUND

Deep Learning (DL) has created a growing demand for simpler ways to develop complex models and efficient ways to execute them. Thus, significant effort has gone into development of frameworks to support a variety of DL models and run seamlessly over heterogeneous and distributed hardware. Increasingly, specialized hardware and hardware acceleration are being used in DL applications to support DL models. Moreover, the specialized hardware and hardware acceleration techniques are tailored for performance of DL operations. As a result, query processing system (e.g., database management systems), which are typically configured to employ computer processing units (CPUs), are unable to perform database operations on DL systems. Consequently, query processing systems are currently prevented from reaping the benefits of advances due to investment in DL, much less combined with DL applications to leverage machine learning with data management.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an aspect, a method may include receiving a query including one or more query operators, determining a query representation based on the one or more query operators, and determining a neural network program based on the query representation, the neural network program including one or more neural network operators for performing the query in a neural network runtime. Further, the method may include generating a neural network data structure based on a dataset associated with the query and executing the neural network program in the neural network runtime over the neural network data structure to generate a query result.

In another aspect, a device may include a memory storing instructions, and at least one processor coupled with the memory and to execute the instructions to: receive a query including one or more query operators, determine a query representation based on the one or more query operators, determine a neural network program based on the query representation, the neural network program including one or more neural network operators for performing the query in a neural network runtime, generate a neural network data structure based on a dataset associated with the query and execute the neural network program in the neural network runtime over the neural network data structure to generate a query result.

In another aspect, an example computer-readable medium (e.g., non-transitory computer-readable medium) storing instructions for performing the methods described herein and an example apparatus including means of performing operations of the methods described herein are also disclosed.

Additional advantages and novel features relating to implementations of the present disclosure will be set forth in part in the description that follows, and in part will become more apparent to those skilled in the art upon examination of the following or upon learning by practice thereof.

BRIEF DESCRIPTION OF THE DRAWINGS

The Detailed Description is set forth with reference to the accompanying figures, in which the left-most digit of a reference number identifies the figure in which the reference number first appears. The use of the same reference numbers in the same or different figures indicates similar or identical items or features.

FIG. 2A is a flow diagram illustrating an example method for generating a DNN program, in accordance with some aspects of the present disclosure.

FIG. 2B is a flow diagram illustrating an example method for generating a DNN data structure, in accordance with some aspects of the present disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes techniques for implementing query processing over deep neural network (DNN) runtimes. In particular, aspects of the present disclosure provide a query processing system configured to generate a DNN program from a database query, and execute the DNN program over a multi-platform DNN runtime. Accordingly, for example, a data processing system may employ the query processing system to perform queries via hardware specialized and/or optimized for DNNs, thereby improving performance of query processing while reducing development effort, leveraging the cross-platform compilation capabilities of DNN runtimes, and providing the ability to perform queries including machine learning prediction.

In accordance with some aspects of the present disclosure, a database may receive a query, determine a DNN program consisting of DNN operations corresponding to the database operations and conditions of the query.

Illustrative Environment

Figure 1:
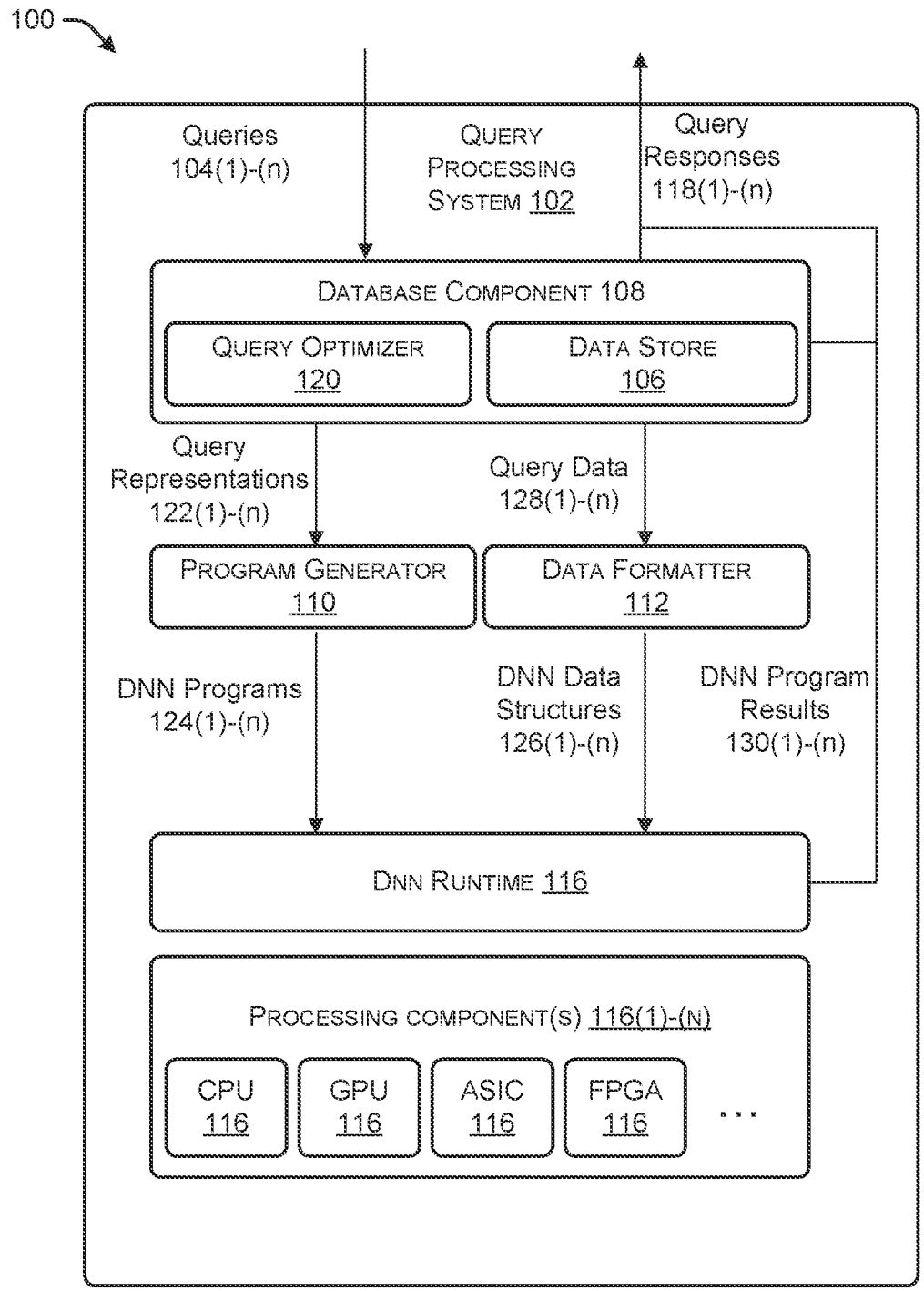
FIG. 1 illustrates an example architecture of a computing system implementing query processing over deep neural network (DNN) runtimes, in accordance with some aspects of the present disclosure.

FIG. 1 is a diagram showing an example of a data processing system 100, in accordance with some aspects of the present disclosure.

As illustrated in FIG. 1, the data processing system 100 may include a query processing system 102 configured to process queries 104 over a data store 106. The data processing system 100 may further include a database component 108, a program generator 110, a data formatter 112, a DNN runtime 114, and one or more processing components 116.

In some aspects, the query processing system 102 may be a client device. Some examples of a client device include computing devices, smartphone devices, Internet of Things (IoT) devices, drones, robots, process automation equipment, sensors, control devices, vehicles, transportation equipment, tactile interaction equipment, virtual and augmented reality (VR and AR) devices, industrial machines, virtual machines, etc. In some aspects, the query processing system 102 may be a cloud computing platform that provides other computing devices with distributed storage and access to software, services, files, and/or data via one or more network(s), e.g., cellular networks, wireless networks, local area networks (LANs), wide area networks (WANs), personal area networks (PANs), the Internet, or any other type of network configured to communicate information between computing devices. As an example, the data processing system 100 may be a provider of software as a service (SaaS), search engine as a service (SEaaS), database as a service (DaaS), storage as a service (STaaS), big data as a service (BDaaS) in a multi-tenancy environment via the Internet, and the query processing system 102 may be used to services queries 104(1)-(n) submitted to the data processing system 100.

The database component 108 may be configured to organize a collection of data on the data store 106. In some aspects, the data store 106 and database component 108 may reside on a single storage device or system or on multiple storage devices or systems such as available at one or more data centers. Further, the database component 108 may include various types of database services (e.g., relational, non-relational, structured query language (SQL), noSQL) for storing, querying, and updating data. As illustrated in FIG. 1, in some aspects, the database component 108 may receive the queries 104(1)-(n) and transmit corresponding query responses 118(1)-(n). Further, the database component 108 may organize data of the data store 106 for any of various types of data processing services (e.g., query processing to perform functions such as anomaly detection, machine learning, data lookup, or any other type of data processing operation).

As illustrated in FIG. 1, the database component 108 may include a query optimizer 120 configured to generate query representations 122(1)-(n). For instance, the query optimizer 120 may receive the query 104(1) and generate the query representation 122(1) corresponding to the query 104(1). In some aspects, a query representation 122 may be a query plan. As used herein, a "query plan" may refer to one or more commands for executing a query over data. Further, in some aspects, the query 104(1) may include a first plurality of commands and the query representation 122(1) may include a second plurality of commands that are optimized to perform the query 104(1) over the data store 106. Additionally, a query representation 122 may be of a different format than the corresponding query 104. For example, the query representation 122(1) may encode the query as a graph and the commands of the query representation may be nodes of the graph. Additionally, or alternatively, the query representations may be generated in a JSON or XML format.

The program generator 110 may be configured to generate DNN programs 124(1)-(n) based on the query representations 122(1)-(n). For example, the program generator 110 may be configured to generate a DNN program 124(1) that employs tensor operations to perform the query 104(1) as represented by the query representation 122(1). In some examples, a DNN program 124 may be a tensor program that employs tensor operations, or any other type of DNN program with DNN operations. Some examples of DNN operations include transposing, indexing, slicing, mathematical operations, linear algebra, random sampling, etc.

In some aspects, the program generator 110 may be configured to map a query command in a query language (e.g., SQL) to one or more DNN operations even though the feature and/or command set of query languages and DNN APIs are vastly different and have different uses. For example, in some aspects, a query representation 122 may be a graph with each command of the query representation 122 represented as a node of the graph. Further, the program generator 110 may be configured to traverse the nodes of the graph, and determine the DNN operations of the DNN program 124 based on the one or more DNN operations corresponding to each node of the graph. Consequently, for example, the query processing component 102 may perform queries via hardware specialized and/or optimized for DNNs, thereby improving performance of query processing while reducing development effort, leveraging the cross-platform compilation capabilities of DNN runtimes, and providing the ability to perform queries including machine learning prediction.

In some examples, the program generator 110 may provide DNN-based implementations (e.g., tensor-based implementations) for the following relational operators: selection, projection, sort, group-by aggregation, natural join (primary key-foreign key, hash-based, and sort-based implementations), left-outer, left-semi and left anti-joins. In addition, in some examples, the program generator 110 may provide DNN-based implementations (e.g., tensor-based implementations) for query expressions, e.g., comparison and arithmetic operations, functions on date data type, in, case, like statements, aggregate expressions using sum, average, min, max, and count aggregates (with or without distinct).

For example, in some aspects, a query 104 may include a primary key-foreign key join. Further, DNN runtimes do not provide an operation for SQL joins. As such, in some aspects, the DNN operations illustrated in TABLE 1 below may be selected by the program generator 110 to perform a primary key-foreign key join.

TABLE 1

Primary Key–Foreign Key Join function FORWARD(self, x) . self: primary key–foreign key join class; x: input columns passed as an array of tensors.
    left,right <-self .GETKEYCOLUMNS(x)
    // Sort keys
    left,leftIndex <-SORT(left,descending = True)
    right, rightIndex <-SORT(right, descending = True)
    // Find matches using binary search
    n <-left.shape [0]
    nPrime <-SMALLESTPOWEROFTWOGREATERTHAN(n)

TABLE 1-continued

Primary Key–Foreign Key Join

```
paddedLeft <-PAD(left, (0,nPrime- n),value = minVal -1)
offset <-nPrime/ /2
bins <-right < paddedLeft[offset]
pos <-bins * off set
offset <-(offset + 1)/ /2
for all i E range(0,int(LOG2(nPrime))) do
    bins <-right < INDEXSELECT(paddedLeft, 0, pos + offset)
    pos <-pos + bins * off set
    offset <-offset/ /2
// Check actual matches
mask <-right == INDEXSELECT(left, 0, pos)
pos <-MASKEDSELECT(pos,mask)
// Generate indexes
leftOutputIndex <-INDEXSELECT(leftIndex, 0, pos)
rightOutputIndex <-MASKEDSELECT(rightIndex, mask)
// Generate output
output <-GENERATEOUTPUT(x,self.out
putColumns,leftOutputIndex,rightOutputIndex)
return output
```

As another example, in some aspects, a query 104 may include a generic hash join. Further, DNN runtimes do not provide an operation for SQL joins. As such, in some aspects, the DNN operations illustrated in TABLE 2 below may be selected by the program generator 110 to perform a generic hash join.

TABLE 2

Generic Hash Join

```
function FORWARD(self, x) > self: generic hash join class; x: input columns passed as
an array of tensors.
    left, right <-self .GETKEYCOLUMNS(x)
    // Initialize
    mod <-POW(2, int(log(left.shape[0])))
    leftIndex <-ARANGE(left.shape[0])
    rightIndex <-ARANGE(right.shape[0])
    // Calculate hash values for join keys
    leftHash <-HASH(left,mod)
    rightHash <-HASH(right,mod)
    // Make the hash values positive
    leftHash <-FMOD(leftHash + mod, mod)
    rightHash <-FMOD(right Hash + mod, mod)
    // Build histogram
    hashBincount <-BINCOUNT(leftHash)
    maxNumRepeatingHash <-MAX(hashBincount)
    leftOutputIndex <-EMPTY(0)
    rightOutputIndex <-EMPTY(0)
    // Build and probe the hash table in an interleaved way
    for all i E RANGE(maxNumRepeatingHash) do
        // Build the current hash table from left
        if i == 0 then
            hashTable <-FULL((mod + 1,)- 1)
        else
            hashTable.FILL__(-1)
        hashTable.SCATTER__(0, leftHash, leftIndex)
        leftIndexScattered <-MASKEDSELECT(hashTable,hashTable > 0)
        // Set mod as the hash value to abandon the already scattered indexes
        leftHash[leftIndexScattered] <-mod
        // Probe the current hash table from right
        leftCandidateIndex <- hashTable[rightHash]
        // Only non-negative values were actually scattered
        validJoinKeyMask <-leftCandidateIndex > 0
        // Get the actually scattered indexes and corresponding right indexes that have the
        same hash values
        validLeftIndex <-MASKEDSELECT(leftCandidateIndex,validJoinKeyMask)
        validRightIndex <-MASKEDSELECT(rightIndex, validJoinKeyMask)
        // Find the matching indexes and construct the output indexes for left and right
        matchMask <-OneLikes(rightHash)
        for all joinKeyIdx E RANGE(self .numJoinKeys) do
            leftJoinKeys <-self .GETLEFTJOINKEYVALUES(x,
            joinKeyIdx)[validLeftIndex]
            rightJoinKeys <-self .GETRIGHTJOINKEYVALUES(x,
            joinKeyIdx)[validRightIndex]
            matchMask <-LOGICALAND(matchMask, leftJoinKeys == rightJoinKeys)
        leftMatchIndex <-MASKEDSELECT(validLeftIndex, matchMask)
        rightMatchIndex <-MASKEDSELECT(validRightIndex, matchMask)
```

TABLE 2-continued

Generic Hash Join

```
    leftOutputIndex <-CAT((leftOut putIndex,leftMatchIndex))
    rightOutputIndex <-CAT((rightOutputIndex, rightMatchIndex))
// Generate output
output <-GENERATEOUTPUT(x, self .outputColumns,leftOutputIndex,le
ftOutputIndex)
return output
```

As another example, in some aspects, a query 104 may include aggregation. Further, DNN runtimes do not provide an operation for aggregation. As such, in some aspects, the DNN operations illustrated in TABLE 3 below may be selected by the program generator 110 to perform aggregation.

TABLE 3

Aggregation

```
function FORWARD(self, x) . self: aggregation class; x: input columns passed as an array
of tensors.
    groupByColumns – self.GETGROUPBYCOLUMNS (x)
    // Concatenate all group by columns into one tensor, sort them and return all unique
    values
    keyConcat – CAT(groupByColumns, dim = 1)
    keyConcatSorted, keyConcatInvIdx – RADIXSORT(keyConcat, returnInverse = True)
    x – [column[keyConcaxtInvIdx] for column in x]
    keyConcatUnique, inverseIndexes – UNIQUECONSECUTIVE(KeyConcatSorted, dim
    = 0, returnInverse = True)
    // Total group count is the size of keyConcatUnique
    total GroupCount – keyConcatUnique.shape[0]
    // Build a dictionary containing for each group by column name, its data tensor
    groupByKeys – { }
    currentColumnIndex –0
    for all column E groupByColumns do
        columnIndexes – ARANGE(currentColumnIndex, currentColumnIndex +
        column.shape[1])
        groupByKeys – INDEXS ELECT (keyConcatUnique, 1, columnIndexes)
        currentColumnIndex – column.shape[1]
    // Evaluate the aggregation functions
    result– [EVALUATE(x, groupByKeys, inverseIndexes, totalGroupCount) for evaluate
    in self.aggregate Evaluation]
    return result
```

As another example, in some aspects, a query 104 may include a generic sort merge join. Further, DNN runtimes do not provide an operation for a generic sort merge join. As such, in some aspects, the DNN operations illustrated in TABLE 4 below may be selected by the program generator 110 to perform a generic sort merge joint.

TABLE 4

Generic Sort Merge Join

```
function FORWARD(self, x). self: generic sort merge join class; x: input columns passed as
an array of tensors.
    left, right – self. GETKEYCOLUMNS (x)
    // Sort keys
    left, leftIndex – SORT(left, descending = True)
    right, rightIndex – SORT (right, descending = True)
    // Discretize the values of join key columns so that bincount is more efficient and its
    output size is bounded
    left, right– self.DISCRETIZE(left, right)
    // Build histograms for the left and right table
    leftBincount, rightBincount – BINCOUNT(left), BINCOUNT(right)
    // Pad the shorter bincount result if the min or max of the left and right table are
    different
    leftBincount, rightBincount – self.PADBINCOUNT(leftBincount, rightBincount)
    // Get the number of rows for each pair of matching join keys
    bincountMul – MUL(leftBincount, rightBincount)
    // Calculate the prefix sums of bincounts
    cumLeftBincount – CUMSUM(leftBincount, dim = 0)
    cumRightBincount getsCUM SUM (rightBincount, dim = 0)
    cumBincountMul – CUMSUM(bincountMul, dim = 0)
```

TABLE 4-continued

Generic Sort Merge Join

```
// Initialize output size and output index
outputSize – cumBincountMul[−1]
outputOffset – ARANGE(outputSize)
// Find the bucket of joining keys to which each output belong
outputBucket – BUCKETIZE(outputOffset, cumBincountMul, right = True)
// Get output indexes for left and right
offset –outputOffset
offset.INPLACESUB (cumBincountMul [outputBucket])
offset.INPLACEADD (bincountMul [outputBucket])
leftOutputIndex – leftIndex[cumLeftBincount [outputBucket] – leftBincount
[outputBucket]+
DIV(offset, rightBincount[outputBucket], rounding_mode = "floor")]
rightOutputIndex – rightIndex[cumRightBincount[outputBucket] –
rightBincount[outputBucket]+
REMAINDER (offset, leftBincount[outputBucket])]
// Generate output
output – GENERATEOUTPUT (x, self.outputColumns, leftOutputIndex,
leftOutputIndex)
return output
```

The data formatter 112 may be configured to generate DNN data structures 126(1)-(N) based on query data 128 of the data store 106. Further, the DNN data structures 126(1)-(n) may be input into the DNN programs 124(1)-(N) to determine query responses 118(1)-(n) to the queries 104(1)-(n). As an example, the DNN program 124(1) may be a tensor program, and the data formatter may generate the DNN data structures 126(1)-(n) as tensors to be input into the DNN program 124(1). As used herein, a "tensor" may refer to a generalization of vectors and matrices to potentially higher dimensions. In some aspects, a tensor may be a data structure organized as an array of numbers. The tensor may be characterized by a degree or order of the tensor. A zeroth-order tensor is a scalar, a first-order tensor is a vector (i.e., a one-dimensional array), a second-order tensor is a two-dimensional array, and so forth. Each dimension of the tensor can have a different respective number of elements or values. In some examples, the data formatter may generate a tensor for each column of a database table. In addition, the dimensionality of the tensor may be based at least in part on the type of data stored in the column. As an example, a column of integers or Boolean values in the data store 106 may be represented as a one dimension tensor (e.g., a vector), while a column of string values may be represented as a two dimensional tensor (e.g., a matrix).

The DNN runtime 114 may be an environment configured to execute the DNN programs 124(1)-(n) on the DNN data structures 126(1)-(n) over the one or more processing components 116(1)-(n) to generate the DNN program results 130(1)-(n) that may be used as the query responses 118(1)-(n). For example, the DNN runtime 114 may be a tensor runtime configured to execute tensor programs. In some aspects, the DNN runtime 114 may provide an executable environment or an interpreter that may be used to train DNN models during a training mode and that can be used to evaluate the DNN models in a non-training mode (e.g., inference or classification mode). During the inference mode, input data can be applied to the DNN model inputs and the input data can be processed (e.g., classified) in accordance with the training of the DNN model.

In some aspects, the bulk of the processing operations performed in implementing a DNN is in performing Matrix×Matrix or Matrix×Vector multiplications. Such operations are compute-bandwidth intensive and memory-bandwidth intensive, where the size of a matrix may be, for example, 1000×1000 elements (e.g., 1000×1000 numbers, each including a sign, mantissa, and exponent) or larger. In some aspects, the DNN runtime 114 may apply techniques to the DNN operations of the DNN programs 124(1)-(n) to reduce the demands for computation as well as memory bandwidth in a given system, whether the system includes a field programmable gate array (FPGA), computer processing unit (CPU), or another hardware platform. In some aspects, the DNN runtime may be provided by a DNN library or framework (e.g., PyTorch, TensorFlow, Apache TVM, etc.).

The one or more processing components 116(1)-(n) may be implemented as a CPU, a graphics processing unit (GPU), a custom or an application specific integrated circuit (ASIC) (e.g., including a system-on-chip (SoC) integrated circuit), a FPGA or other reconfigurable logic, or as a soft processor virtual machine hosted by a physical, general-purpose processor. In addition, in some aspects, the one or more processing components 116(1)-(n) may be configured to accelerate these basic machine learning computations and improve performance, reduce latency and reduce cost of deploying machine learning based applications. Further, the DNN runtime 114 may be configured to execute the DNN programs 124(1)-(n) using processor specific details to further accelerate performance.

Example Processes

FIG. 2A is a flow diagram illustrating an example method 200 for generating a program representation, in accordance with some aspects of the present disclosure. For example, in some aspects, the DNN runtime may be a tensor runtime that performs tensor operations on tensors. Further, as illustrated in FIG. 2A, the database component 108 may receive a query 104 (e.g., "select a form xyz where b=c") including one or more query operators and/or conditions (e.g., where b=c). As described in detail herein, the query optimizer 120 may generate a query representation 122(1) corresponding to the query 104, and the program generator 110 may employ the query representation 122(1) to determine tensor representations 204(1)-(n) for the operations/commands of the query representation 122(1). For example, the program generator 110 may generate a tensor representation 204(1) of the filter condition of the query 104 as represented within the query representation 122(1).

FIG. 2B is a flow diagram illustrating an example method 206 for generating a DNN data structure, in accordance with some aspects of the present disclosure. For example, in some aspects, the DNN runtime may be a tensor runtime that performs tensor operations on tensors. Further, as illustrated in FIG. 2B, the database component 108 may transmit query data 128 from the data store 106 to the data formatter 112. As described in detail herein, the data formatter 112 may generate DNN data structures 126(1)-(n) as tensors that represent query data 128 associated with the queries 104(1)-(n). For example, the data formatter 112 may generate a tensor representation 208(1) of the column x of the table xyz of the database component 108. In some aspects, column x may store string values, and the tensor representation 126(1) may be a matrix where each matrix row corresponds to a database entry within the column x and the $i^{th}$ element of each matrix row corresponds to the $i^{th}$ character of the database entry. Further, in some aspects, the $i^{th}$ element may be a byte encoding of the $i^{th}$ character of the database entry. Additionally, the DNN runtime may perform tensor operations using the tensor representation 204(1) and the tensor representation 208(1) to perform the query. As an example, the DNN runtime may perform a tensor operation using the tensor representation 204(1) and the tensor representation 208(1) to generate a mask that indicates which database entries to the column x meet the condition b=c.

The processes described in FIG. 3 below are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The operations described herein may, but need not, be implemented using the query processor 102. By way of example and not limitation, the method 300 is described in the context of FIGS. 1, 2 and 4. For example, the operations may be performed by one or more of the query processing system 102, the database component 108, the program generator 110, the data formatter 112, the DNN runtime 114, and one or more processing components 116.

Figure 3:
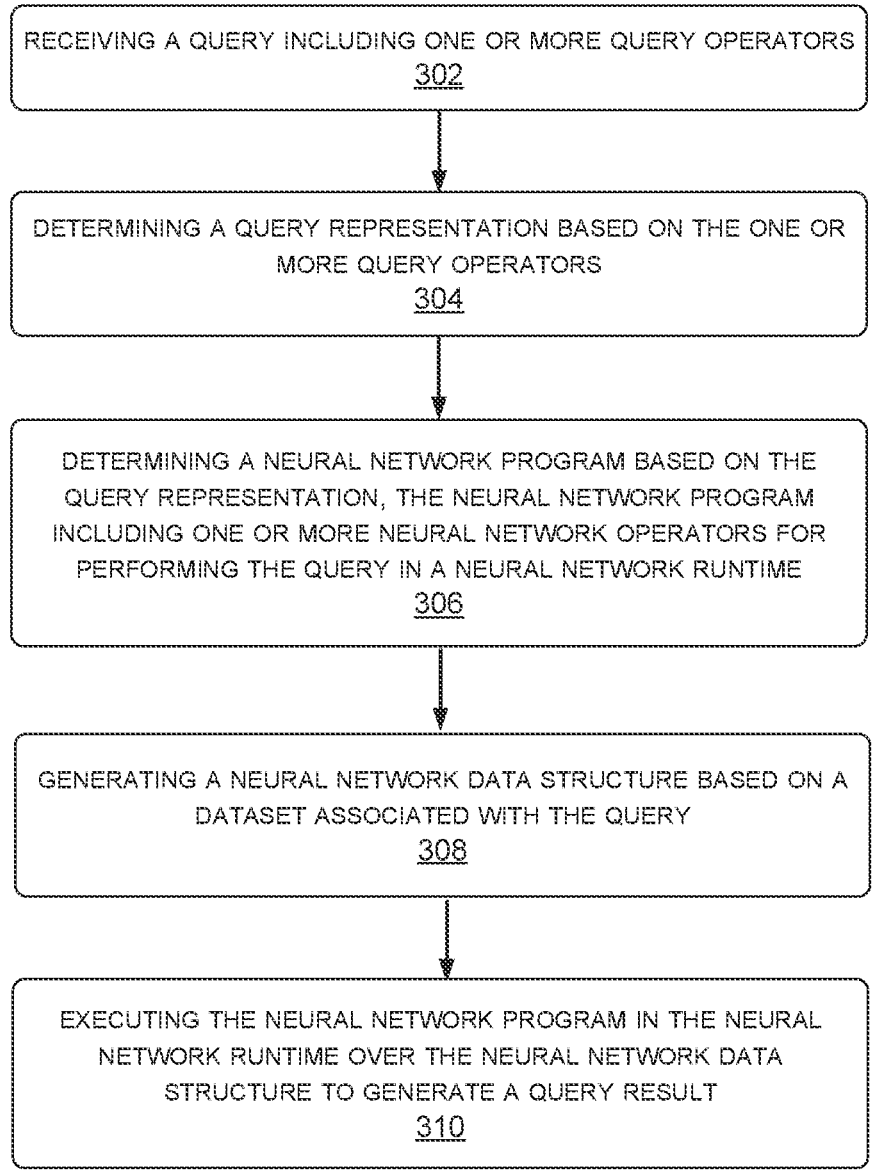
FIG. 3 is a flow diagram illustrating an example method for query processing over DNN runtimes, in accordance with some aspects of the present disclosure.

FIG. 3 is a flow diagram illustrating an example method 300 for query processing over DNN runtimes, in accordance with some aspects of the present disclosure.

At block 302, the method 300 may include receiving a query including one or more query operators. For example, the database component 108 may receive a query 104(1) including one or more query operators. In some aspects, the query 104(1) may be a SQL query and/or include a ML operation.

Accordingly, the data processing system 100, the query processing system 102, the one or more processing components 116, the computing device 400, and/or the processor 402 executing the database component 108 may provide means for receiving a query including one or more query operators.

At block 304, the method 300 may include determining a query representation based on the one or more query operators. For example, the query optimizer 120 may generate a query representation 122(1) for the query 104(1). In some aspects, the query representation 122(1) may be a query plan for executing the query 104(1). In some aspects, the query representation 122(1) may be graph representation of an optimized strategy for executing the query 104(1).

Accordingly, the data processing system 100, the query processing system 102, the one or more processing components 116, the computing device 400, and/or the processor 402 executing database component 108 or the query optimizer 120 may provide means for determining a query representation based on the one or more query operators.

At block 306, the method 300 may include determining a neural network program based on the query representation, the neural network program including one or more neural network operators for performing the query in a neural network runtime. For example, the program generator 110 may generate the DNN program 124(1) based on the query representation 122(1). In some aspects, the DNN program 124(1) may be a tensor program. Further, the DNN program 124(1) may include DNN operations for performing the query 104(1) in a DNN runtime 114. For example, the DNN program 124(1) may include tensor operations for performing the query 104(1) in a tensor runtime. In some aspects, the program generator 110 may generate the DNN program 124(1) by identifying one or more DNN operations corresponding to each of the query operators of the query representation 122(1).

Accordingly, the data processing system 100, the query processing system 102, the one or more processing components 116, the computing device 400, and/or the processor 402 executing the program generator 110 may provide means for determining a neural network program based on the query representation, the neural network program including one or more neural network operators for performing the query in a neural network runtime.

At block 308, the method 300 may include generating a neural network data structure based on a dataset associated with the query. For example, the data formatter 112 may identify query data within the data store 106 that is associated with the query 104(1), and generate one or more DNN data structures 126 corresponding to the query data associated with the data store 106. In some examples, the DNN structures 126(1)-(n) may be tensors representing information stored in the data store 106.

Accordingly, the data processing system 100, the query processing system 102, the one or more processing components 116, the computing device 400, and/or the processor 402 executing the data formatter 112 may provide means for generating a neural network data structure based on a dataset associated with the query.

At block 310, the method 300 may include executing the neural network program in the neural network runtime over the neural network data structure to generate a query result. For example, the DNN runtime 114 may execute the DNN program 124(1) via one of the one or more processing components 116(1)-(n). For instance, the DNN runtime 114 may be a tensor runtime and the tensor runtime may execute the DNN program 124(1) on custom hardware configured to accelerate performance of the DNN program 124(1).

Accordingly, the data processing system 100, the query processing system 102, the one or more processing components 116, the computing device 400, and/or the processor 402 executing the DNN runtime 114 may provide means for executing the neural network program in the neural network runtime over the neural network data structure to generate a query result.

While the operations are described as being implemented by one or more computing devices, in other examples various systems of computing devices may be employed.

For instance, a system of multiple devices may be used to perform any of the operations noted above in conjunction with each other.

Illustrative Computing Device

Figure 4:
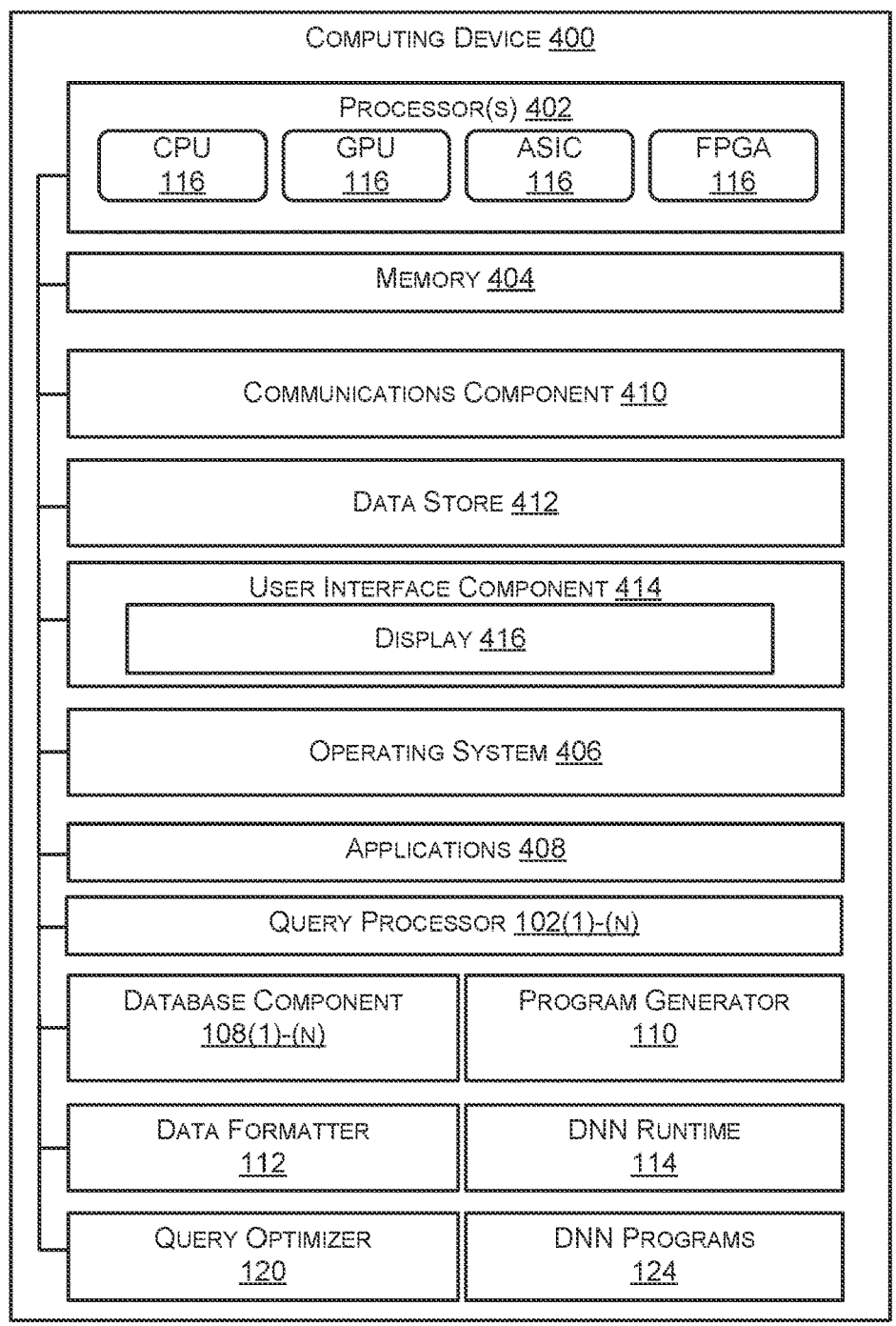
FIG. 4 is a block diagram illustrating an example of a hardware implementation for a computing device(s), in accordance with some aspects of the present disclosure.

Referring now to FIG. 4, an example of a computing device(s) 400 (e.g., query processing system 102). In one example, the computing device(s) 400 includes the processor 402 (e.g., the one or more processing components 116) for carrying out processing functions associated with one or more of components and functions described herein. The processor 402 can include a single or multiple set of processors or multi-core processors. Moreover, the processor 402 may be implemented as an integrated processing system and/or a distributed processing system. In an example, the processor 402 includes, but is not limited to, any processor specially programmed as described herein, including a controller, microcontroller, a computer processing unit (CPU), a graphics processing unit (GPU), an application specific integrated circuit (ASIC), a field programmable gate array (FPGA), a system on chip (SoC), or other programmable logic or state machine. Further, the processor 402 may include other processing components such as one or more arithmetic logic units (ALUs), registers, or control units.

In an example, the computing device 400 also includes memory 404 for storing instructions executable by the processor 402 for carrying out the functions described herein. The memory 404 may be configured for storing data and/or computer-executable instructions defining and/or associated with the query processing system 102, the queries 104(1)-(n), the data store 106, the database component 108, the program generator 110, the data formatter 112, the DNN runtime 114, the query responses 118(l)-(n), the query optimizer 120, query representations 122(1)-(n), the DNN programs 124(1)-(n), the DNN data structures 126(1)-(n), and the DNN program results 128(1)-(n), and the processor 402 may execute the query processing system 102, the database component 108, the program generator 110, the data formatter 112, the DNN runtime 114, the query optimizer 120, and the DNN programs 124(1)-(n). An example of memory 404 may include, but is not limited to, a type of memory usable by a computer, such as random access memory (RAM), read only memory (ROM), tapes, magnetic discs, optical discs, volatile memory, non-volatile memory, and any combination thereof. In an example, the memory 404 may store local versions of applications being executed by processor 402.

The example computing device 400 may include a communications component 410 that provides for establishing and maintaining communications with one or more parties utilizing hardware, software, and services as described herein. The communications component 410 may carry communications between components on the computing device 400, as well as between the computing device 400 and external devices, such as devices located across a communications network and/or devices serially or locally connected to the computing device 400. For example, the communications component 410 may include one or more buses, and may further include transmit chain components and receive chain components associated with a transmitter and receiver, respectively, operable for interfacing with external devices. In an implementation, for example, the communications component 410 may include a connection to communicatively couple the client devices 104(1)-(N) to the processor 402.

The example computing device 400 may include a data store 412, which may be any suitable combination of hardware and/or software, that provides for mass storage of information, databases, and programs employed in connection with implementations described herein. For example, the data store 412 may be a data repository for the operating system 406 and/or the applications 408.

The example computing device 400 may include a user interface component 414 operable to receive inputs from a user of the computing device 400 and further operable to generate outputs for presentation to the user. The user interface component 414 may include one or more input devices, including but not limited to a keyboard, a number pad, a mouse, a touch-sensitive display (e.g., display 416), a digitizer, a navigation key, a function key, a microphone, a voice recognition component, any other mechanism capable of receiving an input from a user, or any combination thereof. Further, the user interface component 414 may include one or more output devices, including but not limited to a display (e.g., display 416), a speaker, a haptic feedback mechanism, a printer, any other mechanism capable of presenting an output to a user, or any combination thereof.

In an implementation, the user interface component 414 may transmit and/or receive messages corresponding to the operation of the operating system 406 and/or the applications 408. In addition, the processor 402 executes the operating system 406 and/or the applications 408, and the memory 404 or the data store 412 may store them.

Further, one or more of the subcomponents of the query processing system 102, the database component 108, the program generator 110, the data formatter 112, the DNN runtime 114, the query optimizer 120, and the DNN programs 124(1)-(n), may be implemented in one or more of the processor 402, the applications 408, the operating system 406, and/or the user interface component 414 such that the subcomponents of the query processing system 102, the database component 108, the program generator 110, the data formatter 112, the DNN runtime 114, the query optimizer 120, and the DNN programs 124(1)-(n), are spread out between the components/subcomponents of the computing device 400.

CONCLUSION

In closing, although the various embodiments have been described in language specific to structural features and/or methodological acts, it is to be understood that the subject matter defined in the appended representations is not necessary limited to the specific features or acts described. Rather, the specific features and acts are disclosed as example forms of implementing the claimed subject matter.

What is claimed is:

1. A method comprising:
receiving a query including one or more query operators;
determining a query representation based on the one or more query operators;
generating, based on the query representation, a neural network program for executing in a neural network runtime at least in part by representing one or more of the query operators, for which a corresponding operator is not provided by the neural network runtime, as one or more neural network operators for performing the query in a neural network runtime, wherein the neural network runtime provides an executable environment to at least one of train neural network models during a training mode or evaluate the neural network models in a non-training mode;
generating a neural network data structure based on a dataset associated with the query; and executing the query by executing the neural network program, including the one or more neural network operators, in the neural network runtime over the neural network data structure to generate a query result.

2. The method of claim 1, wherein the query representation is a query plan, and determining the query representation comprises generating the query plan via a query optimizer.

3. The method of claim 1, wherein determining the neural network program based on the query representation comprises:
identifying a query operator of the one or more query operators; and
determining a neural network operator of the one or more neural network operators, the neural network operator configured to perform at least a function of the query operator.

4. The method of claim 1, wherein the neural network program includes a tensor program, the one or more neural network operations include a tensor operation, and the neural network runtime includes a tensor runtime.

5. The method of claim 1, wherein the dataset includes columnar data, and generating the neural network data structure based on the dataset comprises generating an n-dimensional array based at least in part on a data type of the columnar data.

6. The method of claim 1, wherein the one or more query operators includes a structured query language operator and the one or more neural network operators includes a transformation operator, a reduction operator, an arithmetic operator, or a logical operator.

7. The method of claim 1, wherein the neural network runtime is configured to compile the neural network program over a plurality of processing hardware.

8. The method of claim 1, wherein the query includes a machine learning operator executable within the neural network runtime.

9. A non-transitory computer-readable device having instructions thereon that, when executed by at least one computing device, causes the at least one computing device to perform operations comprising:
receiving a query including one or more query operators;
determining a query representation based on the one or more query operators;
generating, based on the query representation, a neural network program for executing in a neural network runtime at least in part by representing one or more of the query operators, for which a corresponding operator is not provided by the neural network runtime, as one or more neural network operators for performing the query in a neural network runtime, wherein the neural network runtime provides an executable environment to at least one of train neural network models during a training mode or evaluate the neural network models in a non-training mode;
generating a neural network data structure based on a dataset associated with the query; and
executing the query by executing the neural network program, including the one or more neural network operators, in the neural network runtime over the neural network data structure to generate a query result.

10. The non-transitory computer-readable device of claim 9, wherein determining the neural network program based on the query representation comprises:
identifying a query operator of the one or more query operators; and
determining a neural network operator of the one or more neural network operators, the neural network operator configured to perform at least a function of the query operator.

11. The non-transitory computer-readable device of claim 9, wherein the neural network program includes a tensor program, the one or more neural network operations include a tensor operation, and the neural network runtime includes a tensor runtime.

12. The non-transitory computer-readable device of claim 9, wherein the dataset includes columnar data, and generating the neural network data structure based on the data comprises generating an n-dimensional array based at least in part on a data type of the columnar data.

13. The non-transitory computer-readable device of claim 9, wherein the one or more query operators includes a structured query language operator and the one or more neural network operators includes a transformation operator, a reduction operator, an arithmetic operator, or a logical operator.

14. The non-transitory computer-readable device of claim 9, wherein the query includes a machine learning operator executable within the neural network runtime.

15. A system comprising:
a memory storing instructions thereon; and
at least one processor coupled with the memory and configured by the instructions to:
receive a query including one or more query operators;
determine a query representation based on the one or more query operators;
generate, based on the query representation, a neural network program for executing in a neural network runtime at least in part by representing one or more of the query operators, for which a corresponding operator is not provided by the neural network runtime, as one or more neural network operators for performing the query in a neural network runtime, wherein the neural network runtime provides an executable environment to at least one of train neural network models during a training mode or evaluate the neural network models in a non-training mode;
generate a neural network data structure based on a dataset associated with the query; and
execute the query by executing the neural network program, including the one or more neural network operators, in the neural network runtime over the neural network data structure to generate a query result.

16. The system of claim 15, wherein the query representation is a query plan, and to determine the query representation, the at least one processor is further configured by the instructions to generate the query plan via a query optimizer.

17. The system of claim 15, wherein to determine the neural network program based on the query representation, the at least one processor is further configured by the instructions to:
identify a query operator of the one or more query operators; and
determine a neural network operator of the one or more neural network operators, the neural network operator configured to perform at least a function of the query operator.

18. The system of claim 15, wherein the neural network program includes a tensor program, the one or more neural network operations include a tensor operation, and the neural network runtime includes a tensor runtime.

19. The system of claim 15, wherein the dataset includes columnar data, and to generate the neural network data structure based on the data, the at least one processor is further configured by the instructions to generate an n-dimensional array based at least in part on a data type of the columnar data.

20. The system of claim 15, wherein the query includes a machine learning operator executable within the neural network runtime.

\* \* \* \* \*